United States Patent [19]

Reeser et al.

[11] Patent Number: 4,860,950
[45] Date of Patent: Aug. 29, 1989

[54] REMOTE CONTROLLED THERMOSTAT

[75] Inventors: Larry J. Reeser, 2305 C Springhouse Rd., Martinez, Ga. 30907; Henry H. Morton, Wadesboro, N.C.

[73] Assignee: Larry J. Reeser, Martinez, Ga.

[21] Appl. No.: 211,277

[22] Filed: Jun. 24, 1988

[51] Int. Cl.⁴ .......................... F24B 1/18; G08C 19/00
[52] U.S. Cl. .................................... 236/51; 340/825.69
[58] Field of Search ............................ 236/51; 165/11; 340/825.07, 825.69

[56] References Cited

U.S. PATENT DOCUMENTS 3,605,877  9/1971  Isaacs et al. ............................ 165/26
4,606,401  8/1986  Levine et al. ....................... 236/94 X
4,704,607 11/1987  Teather et al. ............ 340/825.69 X

FOREIGN PATENT DOCUMENTS 0920637  6/1982  Japan ...................................... 236/51

*Primary Examiner*—William E. Wayner
*Attorney, Agent, or Firm*—Michael A. Mann

[57] ABSTRACT

A method and apparatus for remotely adjusting the temperature of a closed environment such as a home or building comprising a means for transmitting a coded up-temperature signal and a down-temperature signal as a modulated radio frequency carrier wave, from a portable, battery-powered command module to a stationary receiver operatively connected to a heating/cooling unit. The received signal, upon decoding, activates the heating/cooling unit until the sensed temperature of the building matches the desired temperature. Additionally, a preset temperature stored in memory may be replaced remotely using the command module with a new preset temperature. The apparatus is designed to replace an existing thermostat and to be easily usable, especially by those who are disabled, bedridden or handicapped, to alter the temperature of their environments to comfortable levels.

7 Claims, 2 Drawing Sheets

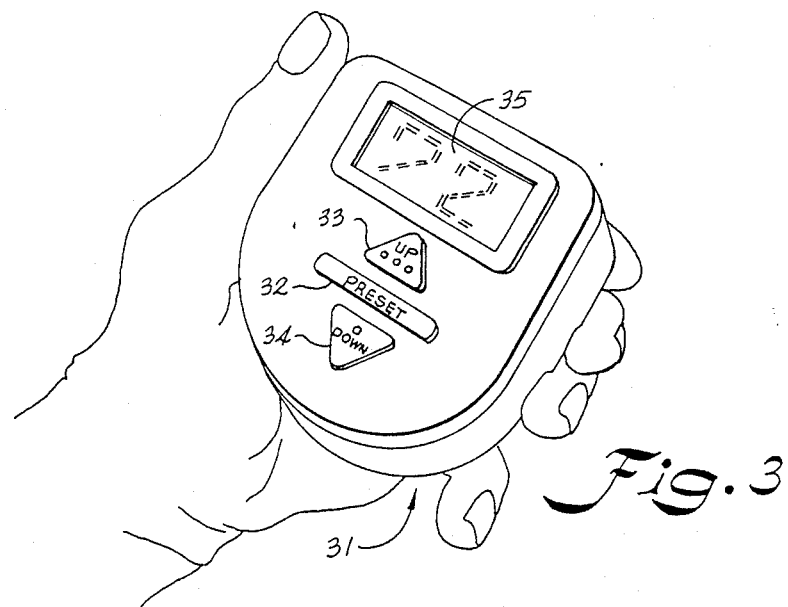
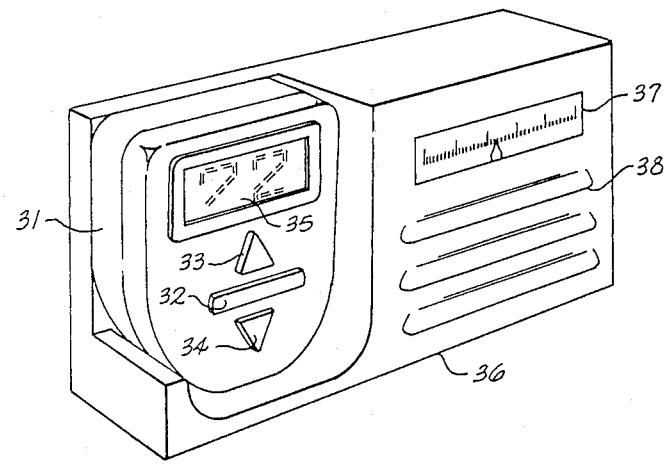

REMOTE CONTROLLED THERMOSTAT

BACKGROUND OF THE INVENTION

The present invention relates to thermostats. More specifically, the invention relates to remotely controlled thermostats that allow a user to increase or decrease the temperature of a closed environment from anywhere within or near the closed environment.

The typical home thermostat is mounted on a wall and connected by electrical circuitry to a heating/cooling unit. By making an adjustment to switches on the thermostat, the temperature setting to which the heating/cooling unit holds the temperature of the building may be changed.

The location of the thermostat is chosen at the time the home or building is constructed; moving the thermostat at a later date is expensive and somewhat difficult. Changing the temperature of a closed environment having a fixed thermostat requires going to the thermostat and moving its switches.

Moreover, there are times when an occupant desires to change the temperature of the home or building but going to the thermostat is either inconvenient, difficult or impossible. For example, if the temperature inside the home falls below a comfortable level at night because the preset temperature is set too low, an occupant might find it inconvenient to get out of bed, turn on a light and change the preset temperature at the thermostat.

If there is an invalid, especially an invalid who is elderly or in a wheel chair, adjusting the thermostat, usually positioned at eye level for a standing adult, may be difficult or impossible. The blind or vision-impaired have an especial problem adjusting thermostats.

For buildings where the thermostat is likely to be in an area of high traffic and where adjustments to the building temperature are the responsibility of a custodian, a locked cage or guard may be installed over the thermostat to prevent tampering. For the temperature of the building to be changed, the custodian must first unlock the guard before moving the thermostat switches.

These and other reasons have suggested the need for a remotely operated thermostat. There are portable thermostats in the prior art. Butkovich, at al. in U.S. Pat. No. 4,585,164 discloses a portable energy level control system that communicates with the heating cooling unit to adjust the temperature to desired levels in specific rooms in a home while other rooms are isolated by closing the heating ductwork. Cherry, et al. in U.S. Pat. No. 4,433,719 also discloses a portable remote environmental control system that adjusts temperature by sending signals to the heating/cooling unit every thirty seconds.

There is Keldmann's temperature regulating system for control of temperature in a room (U.S. Pat. No. 4,391,913) which has a refined temperature sensor in a room that adjusts the wall-mounted thermostat; Neal's thermostat is alterable by remote control (U.S. Pat. No. 4,336,902) using a second thermostat to override the first thermostat, a typical wall-mounted one; and the humidity control system and circuitry of Geisler, et al. (U.S. Pat. No. 4,186,873) relating to humidity control.

The prior art does not contain a device that responds to a simple desire on the part of an occupant to increase or decrease the temperature in a home or building from any location.

It is an object of the invention to provide a method and apparatus for the remote adjustment of the temperature of a closed environment such as a home or building. It is a further object of the invention to provide an easy-to-use, portable module for incrementally increasing or decreasing the temperature of a building at the command of the user. It is a further object of the invention to provide a method and apparatus for adjusting the temperature of a building that may be backfitted into homes having a conventional thermostats.

These and other objects of the invention will be obvious from a fair reading the following description of the present invention and the claims.

SUMMARY OF THE INVENTION

The problems of the prior art are overcome and the objects of the present invention are provided by a remotely controlled thermostat and method for adjusting the temperature of a closed environment such as a home or building comprising a means for transmitting, in the form of a series of coded pulses modulating a carrier wave, a desired change in the temperature of the closed environment from a preset temperature to a receiver operatively connected to a heating/cooling unit. The receiver demodulates the carrier wave and decodes the pulses into the desired temperature change. The heating/cooling unit compares the temperature of the environment, as measured continuously by a temperature sensing means suitably located in the closed environment, with the desired temperature to ascertain if a temperature difference exists, and continues to heat or cool the environment until that temperature difference is reduced nearly to zero. Alternatively, the preset temperature may be changed by a modulated carrier wave signal transmitted by the user.

When not carried from place to place, the command module may be stored in a wall-mounted holder much the same size, and placed in the same location, as the usual thermostat. The temperature sensing means may preferably be incorporated into the holder.

DESCRIPTION OF THE DRAWINGS

FIG. 3 shows a perspective view of the command module.

FIG. 4 shows a perspective view of the wall-mounted command module holder with the command module.

DETAILED DESCRIPTION OF THE PREFERRED EMBODIMENT

The present invention is a method and apparatus for remotely adjusting the temperature of a building.

Figure 1:
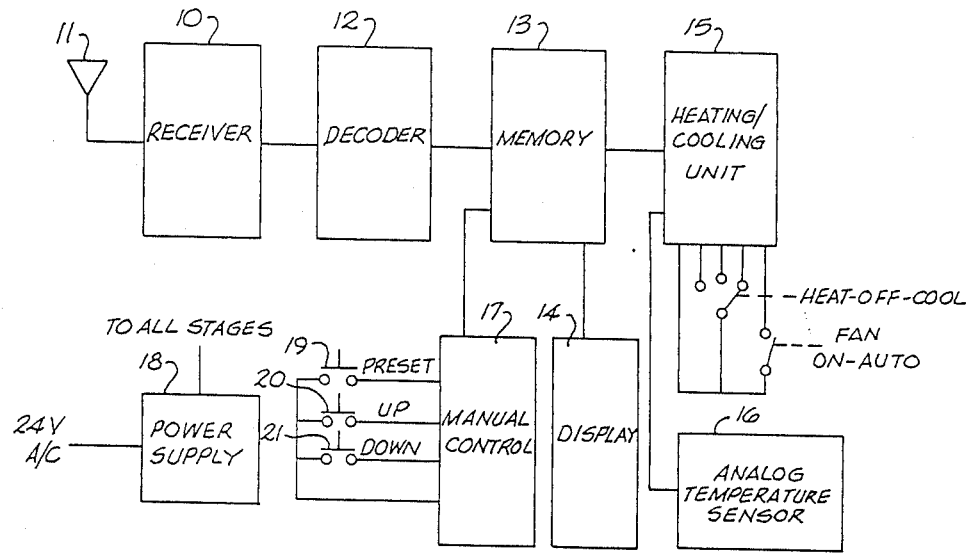
FIG. 1 shows a schematic diagram of the functional elements of the receiver module and the heating/cooling unit.

Referring to FIG. 1, the apparatus comprises a receiver module 10 with built-in antenna 11 operatively connected to receiver 10 which is in turn operatively connected to a decoder 12. The desired temperature after decoding is stored in memory 13 and registers in display 14. The desired temperature is transferred to the controls of a conventional heating/cooling unit 15.

Heating/cooling unit 15 receives continuous temperature information from analog temperature sensor 16, such as a thermometer or bimetallic strip, located conveniently within the closed environment. The two temperatures are compared by heating/cooling unit 15. A difference in the temperatures activates unit 15 which remains actively heating or cooling the building, as appropriate, until the difference is reduced to insignificance.

It is convenient to have a manual control 17 operatively connected to memory 13 for overriding the received signal as well as the usual heat/off/cool and fan switches of heating/cooling unit 15. Manual control 17 has a preset switch 19, an up-temperature switch 20 and a down-temperature switch 21.

Temporarily closing preset switch 19 causes heating/cooling unit 15 to heat or cool the environment to the preset temperature. Closing temporarily the up-temperature switch 20 causes heating/cooling unit 15 to heat the environment to a temperature one incremental unit, such as one degree Fahrenheit, above the preset temperature.

Heating/cooling unit 15 is energized by a power supply 18 electrically connected to the electrical system of the environment.

Figure 2:
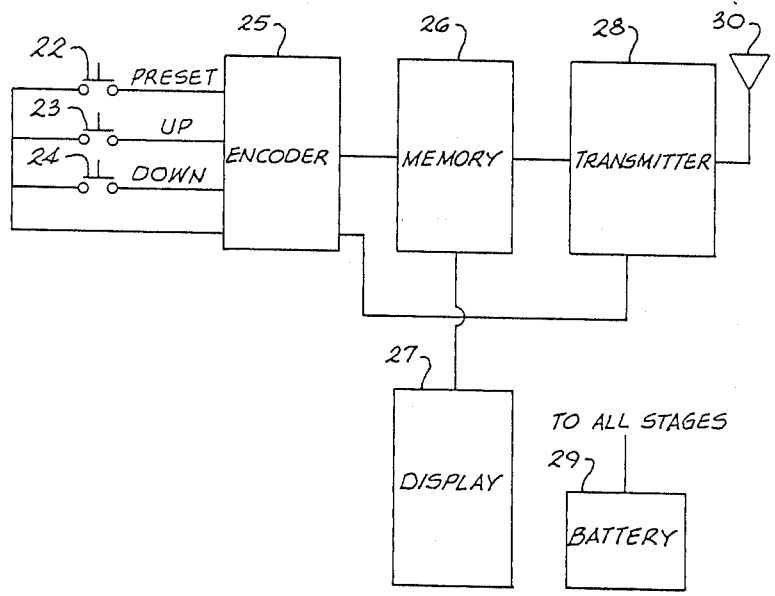
FIG. 2 shows a schematic diagram of functional elements of the command module.

Referring to FIG. 2, the command module in schematic form has a preset switch 22, an up-temperature switch 23 and a down-temperature switch 24 for initiating the heating cooling unit 15 to heat or cool the closed environment to the preset temperature or for input of a desired incremental change in the temperature of the building from the preset temperature. Closing temporarily up-temperature switch 23 sends a signal to heating/cooling unit 15 to increase the temperature by an incremental amount, preferably one degree Fahrenheit. Similarly, temporarily closing down-temperature switch 22 will produce a command to lower the temperature of the environment by an incremental amount.

Closing temporarily preset and up-temperature switches, 22 and 23, commands the preset temperature to be increased by one incremental unit.

The desired temperature change increment is converted by encoder 25 into a series of pulses. The pulses are placed in a memory 26 and shown in a display 27.

Transmitter 28 generates a radio frequency carrier wave and modulates the carrier with the series of pulses from decoder 25. The modulated carrier wave is transmitted via an antenna 30.

FIG. 3 shows command module 31 and preset 32, up-temperature 33 and down-temperature 34 buttons. Preset button 32 operates preset switch 22; up-temperature button 34 operates up-temperature switch 23; down-temperature button 35 operates down-temperature switch 24. Display 35 shows the desired temperature. The three buttons are all physically and visually distinguishable from each other for ease of use, especially at night or when used by the blind or vision-impaired. Shapes other than those shown in FIG. 3 are possible for obtaining sets of mutually distinguishable buttons and button arrangements.

FIG. 4 shows a holder 36 holding command module 31. Command module 31 is easily removable from holder 36. Holder 36 may have an analog temperature sensor 16 therein with vent holes 38 and a temperature indicator 37. Preferably holder 36 is approximately the same size as a conventional fixed thermostat so that holder 36 can cover the area of the wall when the conventional thermostat is removed.

Using the hand-held, battery-powered command module 31, an up-temperature signal or a down-temperature signal is transmitted to remote receiver 10 electrically connected to heating/cooling unit 15 of a closed environment. The signal is sent by pressing up-temperature button 34 on command module 31 once for each degree of temperature the user desires to raise the temperature of a home above a preset temperature. If the preset temperature is 70 degrees Fahrenheit, the user presses up-temperature button 34 twice for a two-degree increase in temperature; or the user may press down-temperature button 35 three times to reduce the temperature of the building to 67 degrees. The desired temperature is stored in memory 13 in command module 31.

Pressing one of the three buttons causes the temporary closing of the corresponding switch. For example, pressing down-temperature button 34 closes temporarily down-temperature switch 24. The temporary closing of a switch causes command encoder 25 to produce a series of pulses that modulate the carrier wave generated by transmitter 28. The modulated carrier wave is radiated to receiver 10 via respective antennas 30 and 11.

Alternatively, the desired temperature could be input to the command module having one button for each of the digits zero through nine plus a preset button, preferably with distinguishable surfaces for night use. In this alternative embodiment, the desired temperature is input directly by pressing the buttons that correspond to the temperature. For example, if the preset temperature is 70 degrees, the temperature of the closed environment could be raised to 72 degrees by pressing the "7" button, then the "2" button.

Heating/cooling unit 15 receives the desired temperature signal from the receiver and compares it to a temperature of the building received continuously from a temperature sensor 16, such as a thermometer or bimetallic strip, positioned at some appropriate location building, preferably where the conventional thermostat would be placed. The desired temperature is compared to the sensed temperature. If a significant difference between the two temperatures exists, the heating/cooling unit operates to reduce the difference and continues to operate until there is no significant difference.

A significant difference is the difference in temperature that is of no consequence to the occupants of a home or building, perhaps half a degree Fahrenheit. It is only important that the dynamics of a home or building not result in the continuous running of a heating/cooling unit as it tries to eliminate very small temperature differences.

Display 35 on command module 31, preferably a large liquid crystal display, perhaps lighted, indicates the temperature setting.

Command module 31 generates a radio frequency carrier wave that has a range of up to three hundred feet and can penetrate walls of typical home and building contruction.

I claim:
1. A battery powered apparatus for remotely adjusting the temperature of a closed environment having a heating/cooling unit comprising:
  (a) a means for encoding a desired temperature into series of pulses having
    an up-temperature signal for increasing a preset temperature setting by an incremental step above the preset temperature;
    a down-temperature signal for decreasing the preset temperature setting by the incremental step below the preset temperature;

a preset temperature signal for changing the closed environment temperature to the preset temperature by activating the heating/cooling unit;
an up-preset temperature signal for increasing the preset temperature by the incremental step; and
a down-preset temperature signal for decreasing the preset temperature by the incremental step to decrease the preset temperature by the incremental step;
(b) a means for generating a radio frequency carrier;
(c) a means for modulating the radio frequency carrier with the series of encoded pulses which modulating means is operatively connected to the encoding means and with the radio frequency carrier generating means;
(d) a transmitter for transmitting the modulated radio frequency carrier which transmitter is operatively connected to the modulating means;
(e) a receiver for receiving the modulated radio frequency carrier which receiver is in spaced relation to said transmitter;
(f) a means for demodulating the series of pulses from the radio frequency carrier which demodulating means is operatively connected to the receiver;
(g) a means for decoding the series of pulses into the desired temperature which decoding means is operatively connected to the demodulator;
(h) a means for comparing continuously two temperatures which comparing means is operatively connected to the heating/cooling unit so that any significant difference between the two temperatures causes the heating/cooling unit to activate and which comparing means is in communication with the decoding means so that the desired temperature is communicated to the comparing means and is one of the two temperatures compared; and
(i) a means for continuously sensing a temperature of the building which temperature sensing means is in communication with the comparing means so that the closed environment temperature can be compared to the desired temperature.

2. The apparatus of claim 1 further comprising
(a) a first memory for storing the desired temperature which first memory is in communication with the encoding means;
(b) a second memory for storing the closed environment temperature which second memory is in communication with the temperature sensing means;
(c) a first means for continuously displaying the desired temperature which first displaying means is in communication with the first memory; and
(d) a second means for continuously displaying the closed environment temperature which second displaying means is in communication with the second memory.

3. The apparatus of claim 2 wherein the up-preset temperature signal is sent by initiating the up-temperature signal simultaneously with the preset temperature signal and the down-preset temperature signal is sent by initiating the down-temperature signal simultaneously with the preset temperature signal.

4. The apparatus of claim 3 wherein the up-temperature signal, the down-temperature signal and the preset temperature signal are initiated by pressing an up-temperature button, a down-temperature button and a preset temperature button, respectively, which buttons are mutually distinguishable by feel.

5. The apparatus of claim 4 wherein the encoding means, the transmitter, the radio frequency carrier means, the modulator means, the up-temperature button, the down-temperature button, the preset button, the first memory and the first display are located in a portable command module.

6. The apparatus of claim 5 wherein the command module can be stored on a holder mounted on a wall of the building when not being carried.

7. The apparatus of claim 6 wherein the holder contains the temperature sensing means.

* * * * *